United States Patent
Prober

(10) Patent No.: US 8,978,513 B2
(45) Date of Patent: Mar. 17, 2015

(54) ENERGY STORING FLYWHEEL AND BEARING ASSEMBLY

(71) Applicant: Paul Prober, Santa Barbara, CA (US)

(72) Inventor: Paul Prober, Santa Barbara, CA (US)

(*) Notice: Subject to any disclaimer, the term of this patent is extended or adjusted under 35 U.S.C. 154(b) by 16 days.

(21) Appl. No.: 13/923,739

(22) Filed: Jun. 21, 2013

(65) Prior Publication Data

US 2014/0260779 A1 Sep. 18, 2014

Related U.S. Application Data

(60) Provisional application No. 61/791,559, filed on Mar. 15, 2013.

(51) Int. Cl.
| | |
|---|---|
| F16F 15/16 | (2006.01) |
| H02K 7/02 | (2006.01) |
| F16C 35/08 | (2006.01) |
| F16C 19/12 | (2006.01) |
| F16C 19/55 | (2006.01) |
| F16C 19/20 | (2006.01) |

(52) U.S. Cl.
CPC ............ *H02K 7/025* (2013.01); *Y10T 74/2119* (2013.01); *F16C 19/12* (2013.01); *F16C 19/55* (2013.01); *F16C 19/20* (2013.01)
USPC .................... 74/573.13; 74/572.12; 74/572.2; 384/603

(58) Field of Classification Search
CPC ............ Y10T 74/2123; Y10T 74/2125; Y10T 74/213; Y10T 74/2126; Y10T 74/2122; F16C 17/08; F16C 19/12; D01H 7/045; D01H 7/042
USPC .................. 74/572.1, 572.2, 572.11–572.13; 384/610, 609, 603, 447
See application file for complete search history.

(56) References Cited

U.S. PATENT DOCUMENTS

| | | | |
|---|---|---|---|
| 572,880 A | 12/1896 | Flannigain | |
| 621,219 A | 3/1899 | Burwell | |
| 1,976,983 A | 10/1934 | Chandler et al. | |
| 2,259,881 A | 10/1941 | Foley | |
| 2,971,770 A | 2/1961 | Wagner | |
| 2,976,736 A | 3/1961 | Cook | |
| 2,983,558 A | 5/1961 | Rudy | |
| 3,698,776 A | 10/1972 | Litman et al. | |
| 3,723,995 A | 4/1973 | Baumann | |
| 3,731,985 A * | 5/1973 | De Gaeta | 384/496 |
| 3,802,275 A | 4/1974 | Stripling | |

(Continued)

*Primary Examiner* — Marcus Charles
*Assistant Examiner* — Yamilka Pinero Medina
(74) *Attorney, Agent, or Firm* — Roberts Mlotkowski Safran & Cole P.C.

(57) ABSTRACT

An energy-storing flywheel assembly is provided with a flywheel having a vertically-oriented axis of rotation, a shaft connected to the flywheel, and a cageless ball thrust bearing rotatably supporting a lower end of the shaft. The flywheel may be formed from a stack of flywheel discs and is preferably relatively large-radiused and massive. The ball thrust bearing includes a stator having a set of three free-floating bearing balls contained within a cylindrical stator recess; a rotor rotatably mounted over the stator which likewise contains a set of three free-floating bearing balls within a cylindrical stator recess, and a single, middle bearing ball centrally disposed between and in mutual engagement with the three bearing balls of the stator and the three bearing balls of the rotor. In operation, the relatively massive flywheel is rotated at a peripheral speed that approaches but does not exceed the speed of sound to avoid fluid drag and the danger of explosive shattering.

23 Claims, 5 Drawing Sheets

(56) References Cited

U.S. PATENT DOCUMENTS

| | | | |
|---|---|---|---|
| 3,964,341 A * | 6/1976 | Rabenhorst | 74/572.12 |
| 4,112,785 A * | 9/1978 | Brobeck | 74/572.11 |
| 4,982,373 A * | 1/1991 | Nagai et al. | 366/279 |
| 5,190,000 A | 3/1993 | van Schaik et al. | |
| 5,568,993 A | 10/1996 | Potzick | |
| 5,590,569 A * | 1/1997 | Nardone et al. | 74/572.12 |
| 6,675,478 B2 | 1/2004 | Sasaki et al. | |
| 6,821,046 B1 | 11/2004 | Waanders | |
| 2011/0232415 A1* | 9/2011 | Early et al. | 74/572.1 |

* cited by examiner

ENERGY STORING FLYWHEEL AND BEARING ASSEMBLY

RELATED APPLICATIONS

This application claims priority of provisional patent application Ser. No. 61/791,559 filed Mar. 15, 2013.

FIELD

This invention generally relates to devices for storing mechanical energy, and is particularly concerned with an energy storing flywheel and cageless ball bearing assembly.

BACKGROUND

Interest in flywheels as energy storage devices has increased recently as a result of the movement toward "green" energy produced from windmills, as such flywheels could be used in a windmill-based electrical power station to provide power output during periods when ambient winds are low. Such flywheels may also be used in solar-based electrical power stations to provide power output after sunset.

Flywheel energy storage has a number of advantages that make it an attractive design option. Compared with other ways to store electricity, flywheel energy storage systems have long lifetimes, lasting decades with little or no maintenance. Full-cycle lifetimes quoted for flywheels range from between $10^5$ and $10^7$ start-stop cycles of use. Such systems also have a potentially high energy density (100-130 W·h/kg, or 360-500 kJ/kg), in addition to large maximum power output. The energy efficiency (ratio of energy out per energy in) of flywheels can be as high as 90%. Typical capacities range from 3 kWh to 133 kWh. Rapid charging or discharging of a flywheel system can occur in less than 15 minutes.

Because the energy storage capacity of a flywheel increases with the square of its rotational speed, most energy-storing flywheel systems are designed to operate at very high rotational speeds (e.g. 10,000-60,000 rpms or more). But while such high speed rotation advantageously increases the energy storage capacity of the system, it also results in a number of disadvantages. High speed flywheels must be precision-constructed of high tensile strength material to maintain balance and structural integrity during operation. To cope with the frictional losses associated with such high speeds, precision bearings are necessary. In some systems, conventional ball or roller bearings are used wherein the ball or roller bearings are caged within concentric races. To reduce friction to acceptable levels and to insure longevity, the cages, races and balls or rollers of such mechanical bearings must be machined to exacting tolerances. To further reduce friction, some flywheel energy storage systems use pressurized air or repulsive magnet bearings. However, such levitating-type bearings substantially increase the costs associated with such systems and impose practical limitations on the weight of the flywheel. Because of the potential dangers associated with an explosive shattering of the flywheel caused by the large centrifugal forces generated at such high speeds, it is necessary to contain them within a thick-walled housing or a recess in the ground. For flywheels rotated at speeds high enough to exceed the sound barrier around their periphery, it is desirable to at least partially evacuate the interior of the housing to eliminate the resulting turbulent air drag losses, and the wear around the outer edge of the flywheel due to air friction. All of these requirements increase the overall cost of the system.

SUMMARY

In view of the aforementioned shortcomings associated with high-speed flywheel designs, there is a need for a flywheel design that maintains all or most of the energy-storing advantages of prior art flywheel systems but which is simpler in construction, easier and less expensive to manufacture, and safer to operate. To these ends, the energy-storing flywheel assembly of the invention comprises a flywheel having a vertically-oriented axis of rotation; a shaft assembly connected to the flywheel and having an axis of rotation that is collinear with the axis of rotation of the flywheel, and a cageless ball thrust bearing rotatably supporting a lower end of the shaft assembly. The cageless thrust bearing includes a stator having a cylindrical recess, and a set of three free-floating bearing balls contained within the stator recess; a rotor rotatably mounted over the stator, the rotor having a cylindrical recess that is coaxial with the stator cylindrical recess and which likewise contains a set of three free-floating bearing balls, and a single, middle bearing ball centrally disposed between and in mutual engagement with the three bearing balls of the stator and the three bearing balls of the rotor.

The three bearing balls contained in the stator and the three bearing balls contained in the rotor preferably have a same diameter. The diameter of the middle bearing ball may be no less than the ⅔ of the diameter and no greater than twice the diameter as that of the three bearing balls contained in the stator and the three bearing balls contained in the rotor. The single, middle bearing ball preferably contacts the three bearing balls of the stator and the three bearing balls of the rotor at about a 45° angle from a plane that intersects a center of the middle bearing ball.

The cageless ball thrust bearing eliminates both the cages and races associated with conventional ball bearings, greatly simplifying the over-all structure of the flywheel assembly without any significant compromise in friction reduction or bearing longevity. Moreover, the high load capacity of such a cageless ball thrust bearing allows the energy storage to be accomplished via the use of a relatively massive and large-radiused flywheel rotating at substantially slower speeds relative to prior art flywheels having similar energy storage capacities. Such a higher mass, slower speed flywheel in turn allows the use of cheaper, lower-tensile strength materials for the flywheel and reduces the possibility of explosive shattering of the flywheel due to centripetal forces.

The flywheel is preferably continuously solid at every point along its radius, and the amount of mass per unit of circumferential length remains constant or increases in a radially outward direction. The flywheel may be formed from a plurality of stacked, disc-shaped flywheel sections for ease of construction and assembly. Each flywheel section is preferably formed from pelletized metal such as steel or lead imbedded in a matrix of plastic material, and includes a continuous metal rim around its outer periphery to increase the flywheel's tensile strength and decrease the risk of centrifugal shattering during operation. Plastic washers are preferably disposed between adjacent stacked flywheel sections in order to level and uniformly engage the stacked flywheel sections over their horizontal surfaces. The washers also serve as disc brake-like energy absorbers in the event of a catastrophic failure of the flywheel assembly wherein either the vertical shaft assembly or one of the flywheel sections of the assembly seizes. In such a case, the washers would allow for a gradual slowing down of the rotating flywheel sections by heating up and melting.

The invention further encompasses a cageless ball thrust bearing that comprises a stator having a cylindrical recess, and a set of three free-floating bearing balls contained within the stator recess; a rotor rotatably mounted over the stator, the rotor having a cylindrical recess that is coaxial with the stator cylindrical recess and which likewise contains a set of three free-floating bearing balls, and a single, middle bearing ball centrally disposed between and in mutual engagement with the three bearing balls of the stator and the three bearing balls of the rotor, wherein the middle bearing ball has a same or nearly same diameter as that of the three bearing balls contained in the stator and the three bearing balls contained in the rotor.

The diameter of the bearing balls is preferably sufficiently smaller than the diameter of the cylindrical stator and rotor recesses that contain them such that the three bearing balls contained in both the stator and rotor cylindrical recesses do not contact one another when uniformly spaced 120° around their respective recesses. The radius of the stator and rotor recesses may be at least 108% of the diameter of the bearing balls contained in each. The single, middle bearing ball preferably contacts the three bearing balls of the stator and the three bearing balls of the rotor at between about a 45° and 60° angle from a plane that intersects a center of the middle ball bearing, and more preferably at a 45° angle so that the load on the bottom and side walls of the stator and rotor recesses is equalized.

In a method of operation of the flywheel and bearing assembly, the flywheel is rotated at a speed such that an outer periphery of the flywheel approaches but does not exceed the speed of sound to avoid supersonic turbulence and drag that would otherwise occur.

DETAILED DESCRIPTION OF THE PREFERRED EMBODIMENT

Figure 1A:
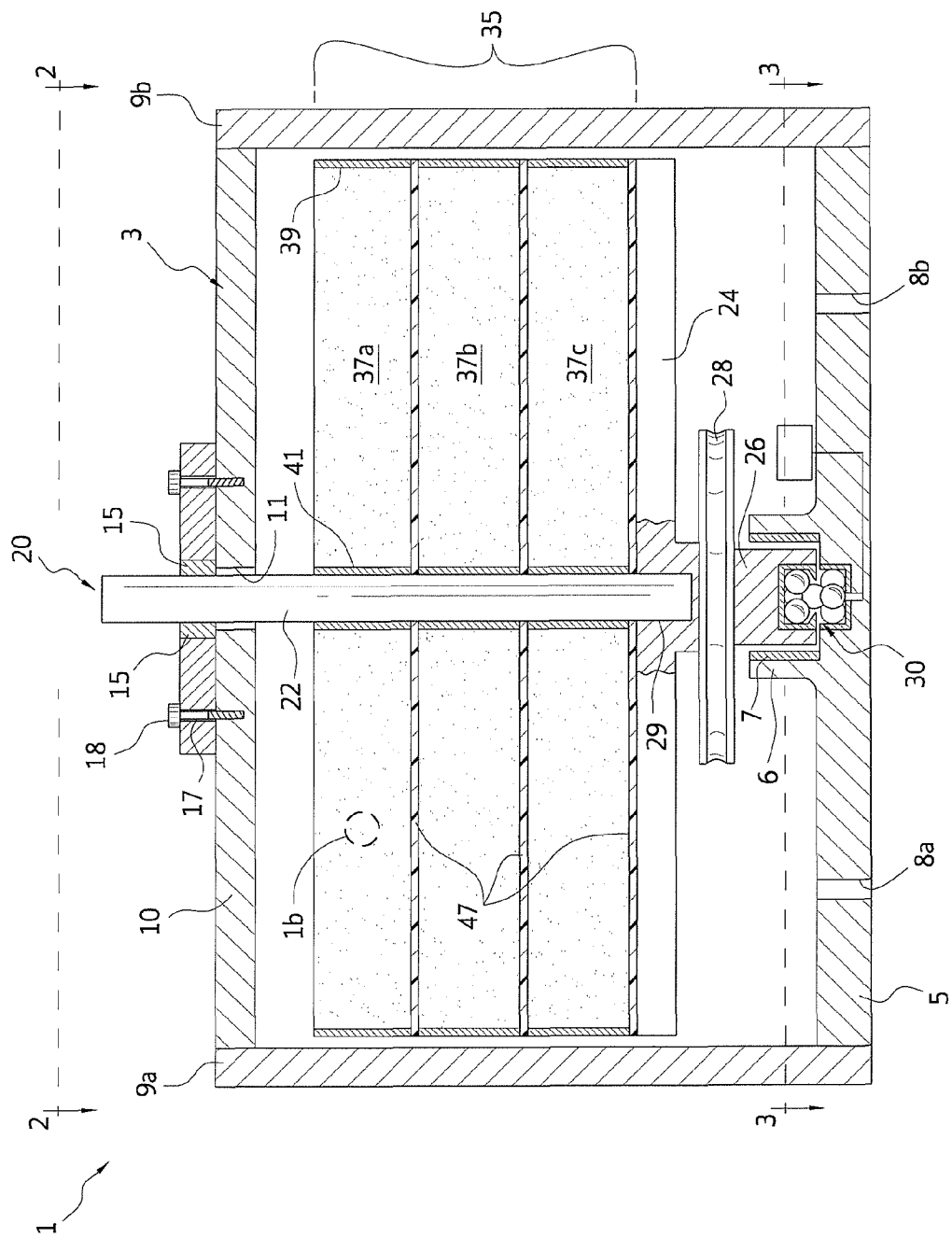
FIG. 1A is a side cross-sectional view of the energy-storing flywheel and bearing assembly of the invention.
Figure 2:
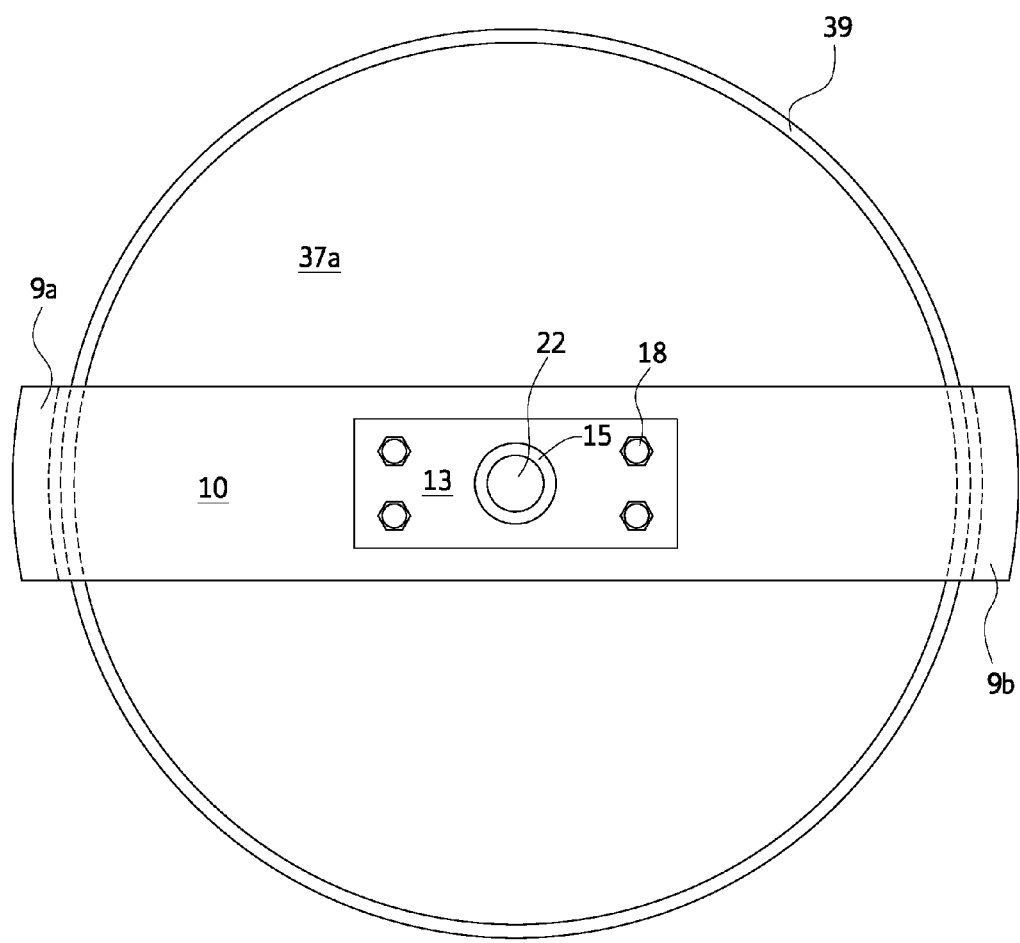
FIG. 2 is a top plan view of the energy-storing flywheel and bearing assembly illustrated in FIG. 1 along the line 2-2.
Figure 3:
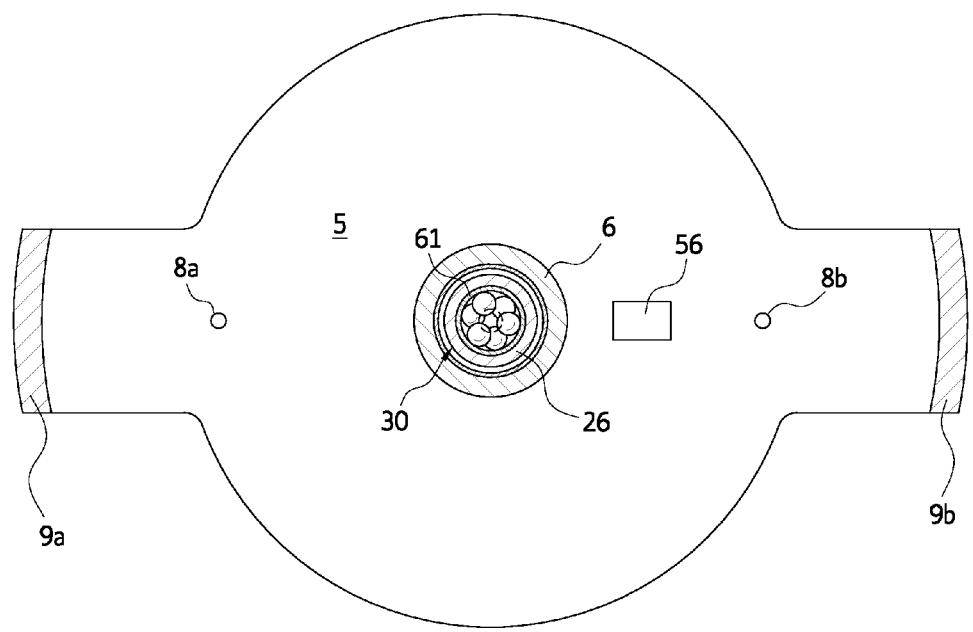
FIG. 3 is a bottom cross-sectional view of the energy-storing flywheel and bearing assembly along the line 3-3.

With reference now to FIGS. 1A, 2, and 3 the flywheel and bearing assembly 1 comprises a support frame 3 having a base plate 5. Centrally disposed on the upper surface of the base plate 5 is a protruding annular wall 6. The upper, inner surface of the annular wall 6 includes a bearing 7 which is preferably a bronze annular sleeve-type bearing. Bolt holes 8a, 8b best seen in FIG. 2 are symmetrically spaced on either side of the annular wall 6 to the base plate 5 to be securely mounted on the floor of a building. While only two such bolt holes 8a, 8b are shown in the Figures, the actual number in a practical embodiment would be much higher (for example sixteen or so) in order to effectively resist the shear and torque forces that will occur between the base plate 5 and the floor of the enclosing building (not shown) during the operation of the assembly 1. A pair of vertically-standing side members 9a, 9b are connected at their bottom ends to opposite ends of the base plate 5, and are further connected at their top ends to a top member 10 that is best seen in FIG. 3. The top member 10 has a central, circular opening 11. The base plate 5, side members 9a, 9b and top member 10 are all preferably formed from structural steel or other relatively strong alloy. Connection between the base plate 5, side members 9a, 9b and top member 10 may be by weld joints, bolts, or any strong, conventional attachment technique. With reference to FIGS. 1A and 2, the top member 10 includes a bearing plate 13 having a centrally positioned ball bearing 15, and four bores 17 for receiving mounting bolts 18. The bores 17 are oversized relative to the threaded shafts of the bolts 18 to allow the position of the bearing plate 13 to be adjusted relative to the top member for a purpose that will become evident hereinafter.

With reference again to FIG. 1A, the flywheel and bearing assembly 1 further comprises a shaft assembly 20 having a vertically-oriented axis of rotation. Shaft assembly 20 is rotatably mounted within the support frame 3, and includes a spindle 22, a disc-shaped support table 24, and an enlarged base portion 26. A pulley 28 is fixedly mounted on the shaft assembly 20 to transmit torque to the shaft assembly 20 from a drive belt (not shown) that mechanically links the pulley 28 to a driven shaft. In the above-ground embodiment of the invention illustrated in FIG. 1, the pulley 28 is fixedly mounted around the base portion 26. However, in a below-ground embodiment of the invention, the pulley 28 would be fixedly mounted at the upper end of the spindle 22 above the walls of the recess containing the flywheel and bearing assembly 1 so that the pulley 28 could be easily engaged to an above-ground drive belt. The spindle 22, disc-shaped support table 24, and enlarged base portion 26 are all concentrically aligned with co-linear axes of rotation so that the shaft assembly 20 can rotate at slow speeds (relative to prior art flywheels) of up to about 5000 rpms without undue vibration. While the diameter of the support table may be of any size and still fall within the purview of the invention, a preferred diameter ranges from about 3 to 20 ft. The bottom end of the spindle 22 is fixedly connected to the support table 24 and the base portion 26, but is also removably mounted to these components via a joint 29 formed in part from a cylindrical recess that extends through the disc-shaped support table 24 as shown. Joint 29 may for example include screw threads on the outer surface of the bottom end of the spindle 22 that are mutually-engageable to complementary screw threads circumscribing the inner surface of the recess of the joint 29. Alternatively, joint 29 may include set screws that interlock the cylindrical bottom end of the spindle 22 within the cylindrical recess of the joint 29. The removability of the spindle 22 from the support table 24 greatly facilitates the installation of the flywheel 35, as will become evident hereinafter. The upper end of the spindle 22 extends through the circular opening 11 of the top member 10 and is rotatably connected to the bearing plate 13 via ball bearing 15. The base portion 26 of the shaft assembly 20 is rotatably journaled within the protruding annular wall 6 of the base plate 5 of the frame 3 via bronze bearing 7 and a cageless ball thrust bearing 30.

Figure 1B:
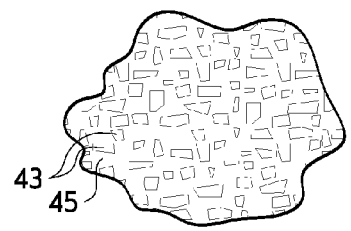
FIG. 1B is an enlargement of the area circled in phantom in FIG. 1A, illustrating the particulate metal/plastic matrix constitution of the flywheel sections.

With reference again to FIGS. 1A and 2, the flywheel 35 of the assembly 1 preferably comprises a plurality of disc-shaped flywheel sections 37a, 37b and 37c stacked over one another as shown. The division of the flywheel 35 into flywheel portions 37 renders the flywheel 35 easier to manufacture, transport, and install over the disc-shaped table 24 of the shaft assembly 20 since it is easier to handle several lighter-weight flywheel sections 37 than the entire flywheel 35 at once. Each flywheel section 37 includes a peripheral rim 39 formed from steel or other strong alloy to ensure that the section 37 will not fly apart during operation due to centripetal forces. Each flywheel section 37 further includes a central annular bushing 41 formed from bronze or the like that closely and slidably fits around the outside surface of the spindle 22 to prevent wobbling that could otherwise occur between the sections 37 and the spindle 22 during rotational operation. With reference now to FIG. 1B, the flywheel sections 37 are principally formed from metal particles or granules 43 encased in a matrix of plastic material 45. In one example of the invention the metal particles 43 are formed from lead, and the plastic material is a high-density polyethylene (HDPE) plastic. Re-cycled plastic milk bottles are a preferred source of such plastic material. If the plastic material constituted 20% by volume of each flywheel section 37 and particulate lead constituted the remaining 80% of the volume, the density of each flywheel section 37 would be about 578 lbs./ft.$^3$. Of course, particulate scrap steel could also be used in which case the density of the flywheel sections would be about 403 lbs./ft.$^3$ While the lower density would lower the over-all energy storage capacity of the resulting flywheel 35, the very low cost of scrap steel vs. lead may more than offset this disadvantage. Exemplary dimensions of the flywheel sections 37 may be 7 feet in diameter, and four inches in thickness. Such dimensioning renders the flywheel sections 37 relatively easy to manufacture and transport, as such a section 37 when made from a 20%-80% by volume mixture of HDP and particulate scrap steel would weigh about 5,167 lbs. or 2.58 tons.

As best seen in FIG. 1A, disc-shaped washers 47 are disposed between the support table 24 and the bottom-most flywheel section 37c and also between the remaining flywheel sections 37b and 37a. Preferably, these washers are made of the same plastic material (e.g. HDPE) used to form the plastic matrix 45 of the flywheel sections 37a-37c. The function of these washers is two-fold. First, the washers 47 plastically deform in response to the compressive loads applied to them by the weight of the flywheel sections 37a-37c. This plastic deformation fills in any gaps in the surface-to-surface contact between the flywheel sections 37a-37c and increases the frictional interface between them. This increased frictional interface in turn mechanically unitizes the flywheel sections 37a-37c so that the torque applied by the support table 24 is effectively transmitted to all of the flywheel sections at once. Second, in the event of a catastrophic failure caused by, for example, the seizure of the shaft assembly 20 within the frame 3, the washers 47 would act as "disc brakes" between the support table 24 and adjacent flywheel sections 37a-37c and would gradually slow the rotating flywheel sections down by heating up and melting.

Figure 4:
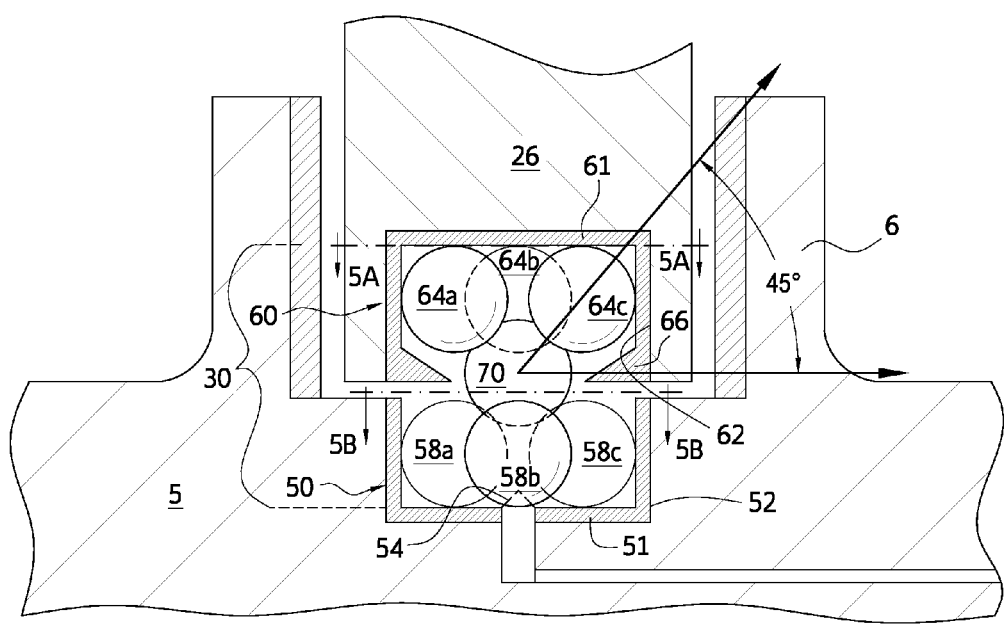
FIG. 4 is an enlarged cross sectional side view of the ball thrust bearing of the invention.
Figure 5A:
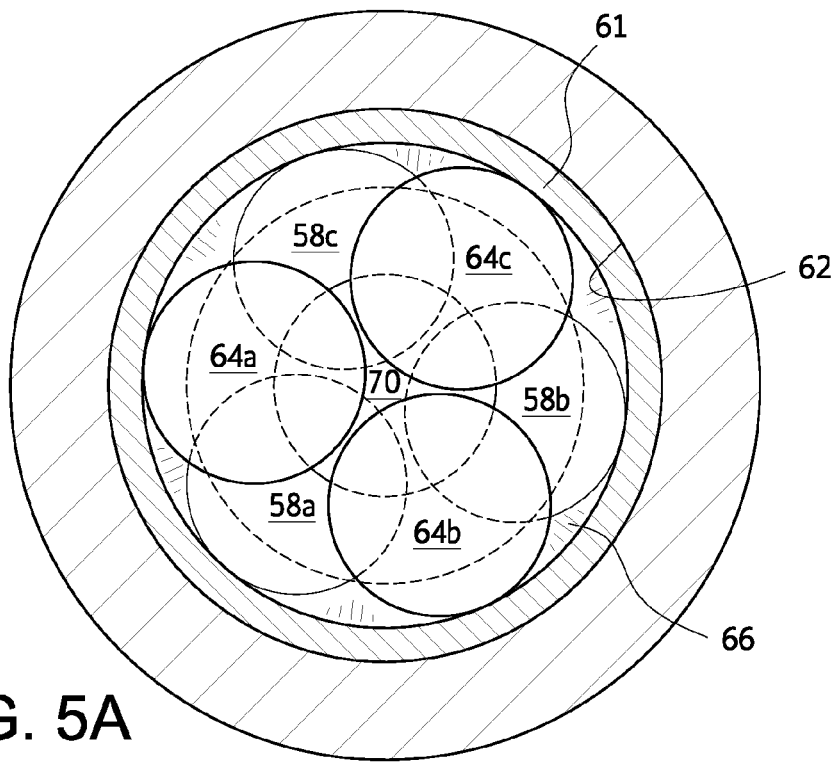
FIGS. 5A and 5B are plan cross sectional views of the thrust bearing illustrated in FIG. 4 along the lines 5A-5A and 5B-5B.
Figure 5B:
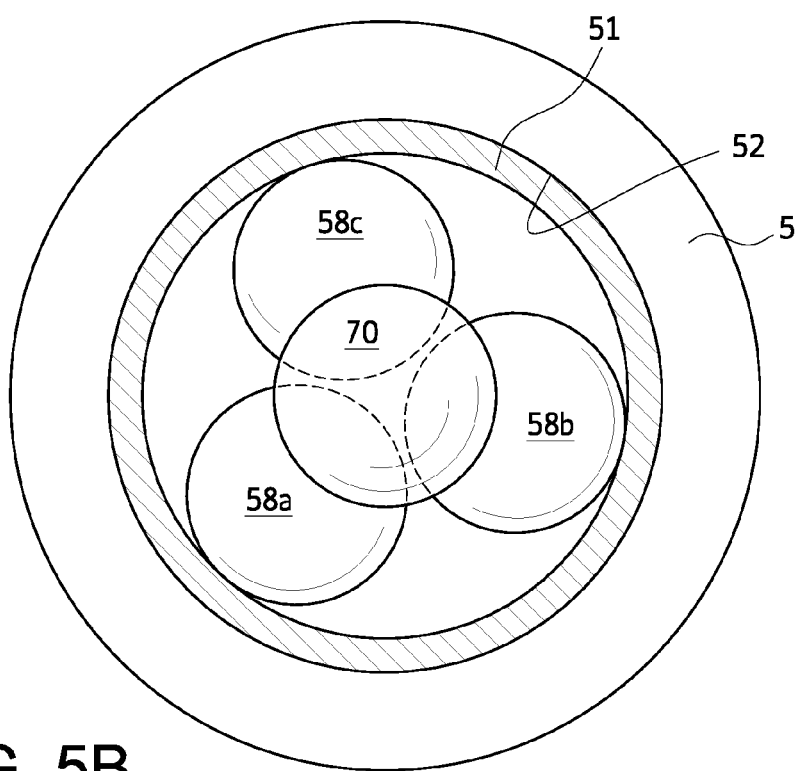
Figure 6A:
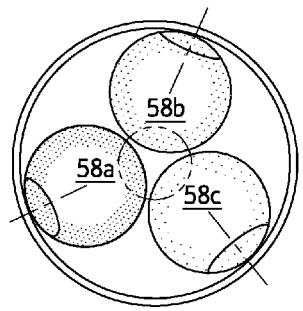
FIGS. 6A-6I illustrate the orbital and rotational movement of the bearing balls within the stator of the bearing throughout 18 rotations of the shaft assembly.
Figure 6B:
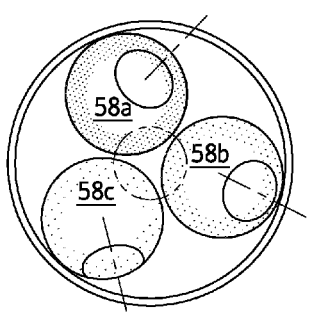
Figure 6C:
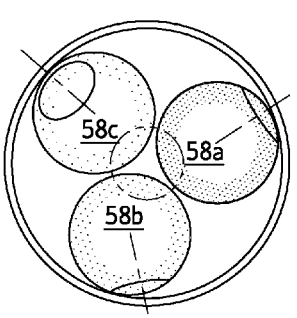
Figure 6D:
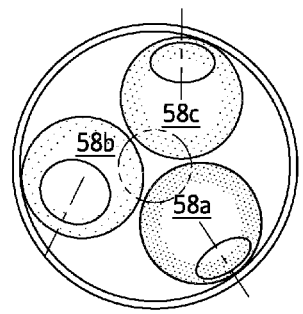
Figure 6E:
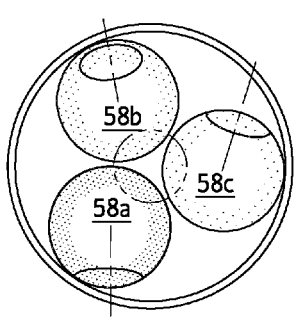
Figure 6F:
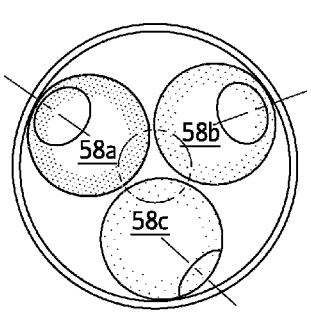
Figure 6G:
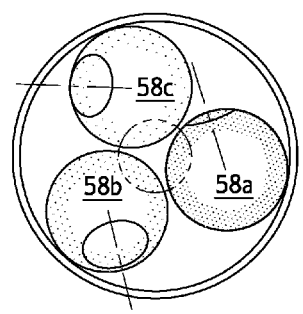
Figure 6H:
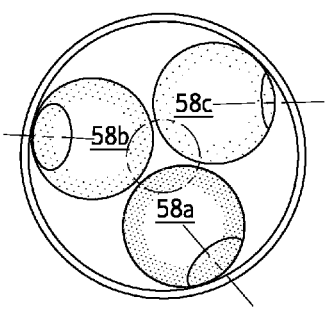
Figure 6I:
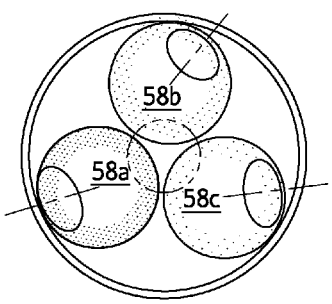

With reference now to FIGS. 4, 5A and 5B, the ball thrust bearing 30 of the invention comprises a stator 50 formed from a stator cup 51 closely fitted into a cylindrical recess 52 in the base plate 5. Such close fitting may be accomplished by chilling the cup 51 sufficiently below the expected ambient temperature of the assembly 1 to induce enough thermal contraction to allow it to be inserted into the recess 52. Recess 52 includes a lubricant outlet 54 that extends through the circular floor of the stator cup 51. Outlet 54 is connected to a lubricant source 56. Three cageless, free-floating bearing balls 58a, 58b and 58c are contained within the cup 51. Bearing balls 58a, 58b and 58c are preferably precision-made from steel or stainless steel and may have case-hardened and/or chrome-plated exteriors to reduce wear and increase longevity. The material forming the annular wall and circular floor of the stator 50 that contains the bearing balls 58a, 58b and 58c should have the same hardness as the surface of the bearing balls. It would be possible of course to dispense with the stator cup 51 and to use the annular and circular surfaces of the cylindrical recess 52 for this purpose. However, the provision of a separate stator cup 51 that can be precision-machined out of an alloy having the same hardness as the bearing balls 58a, 58b and 58c is greatly advantageous over the use of the recess 52 to contain the bearing balls, since it is far easier to machine a relatively small shell 51 to the tolerances needed in the bearing 30 than the recess 52 in the large and base plate 5. In short, such a design allows the cylindrical recess 52 to be fabricated with looser tolerances than the bearing 30 and further allows the surrounding portion of the stator 50 and the base plate 5 to be formed from a wide range of common and inexpensive steel alloys instead of an alloy having a very specific hardness.

In absolute terms, the diameter of the bearing balls may range considerably, but are from one-half inch to one foot diameter in the preferred embodiment. In relative terms, the diameter of the bearing balls 58a, 58b and 58c are the same, and large enough so that the bearing balls closely approach one another when uniformly spaced 120° around the stator recess 52, but small enough such that they do not contact one another when uniformly spaced 120° around the stator recess 52. To avoid such contact (and the resultant undesirable friction) the radius of the stator cup 51 is a little less than 108% of the diameter of the bearing balls 58a, 58b and 58c contained therein.

The ball thrust bearing 30 further includes a rotor 60 formed in the bottom end of the enlarged cylindrical base portion 26 of the shaft assembly 20. Like the previously-described stator 50, rotor 60 includes a cylindrical cup 61 disposed in a closely-fitting cylindrical recess 62 that contains three upper bearing balls 64a, 64b and 64c. These upper bearing balls 64a, 64b and 64c are preferably the same diameter, type, and surface harness as the lower bearing balls 58a, 58b and 58c. The material forming the walls of the cylindrical cup 61 of the rotor 60 should have the same hardness as the surface of the bearing balls 64a, 64b and 64c. An annular retaining wall 66 circumscribes the inner edge of the rotor recess 62 and helps to retain the bearing balls 64a, 64b and 64c during assembly of the bearing 30. A single, middle bearing ball 70 contacts the three bearing balls 58a, 58b and 58c of the stator and the three bearing balls 64a, 64b and 64c. Again, middle bearing ball 70 is preferably the same diameter, type, and surface hardness as the lower and upper bearing balls 58a, 58b and 58c and 64a, 64b and 64c although it is within the scope of the invention for the middle bearing ball 70 to have a diameter that is between ⅔rds to twice the diameter of the lower and upper bearing balls. While the angle of contact between the middle bearing ball 70 and the bearing balls of the stator 50 and rotor 60 can range between about a 45° and 60° angle from a plane that intersects a center of the middle bearing ball, an angle of about 45° is preferred as such angular contact causes each of the bearing balls of the stator 50 and rotor 60 to apply a same pressure to the annular interior walls of the circular bottom or top walls of their respective bearing cups 51 and 61. Such uniformity of pressure promotes even wear on the bearing cup walls, thereby increasing longevity of the bearing 30.

The thrust bearing 30 operates in a manner similar to a driven double planetary gear. The bearing balls 58a, 58b and 58c and 64a, 64b and 64c rotate around the bearing cups 51, 61 at one-seventh to one-ninth the rotational speed of the shaft assembly 20, thereby minimizing wear between the bearing balls and the stator and rotor cups 51, 61. Hence if the flywheel turns at 50 rpms, the lower and upper sets of bearing balls 58a, 58b and 58c and 64a, 64b and 64c will rotate around the walls of their respective cups 51, 61 at a maximum of about 10 rpms. The three upper and three lower bearing balls will self-space themselves 120° apart within a few rotations of the shaft assembly 20, thus obviating the need of precision-made ball cages which not only reduces the expense of the ball thrust bearing 30, but also reduces the friction, allowing the flywheel and bearing assembly 1 to store energy for longer periods of time. Each of the lower and upper bearing balls 58a, 58b and 58c and 64a, 64b and 64c exerts only ⅙ the total load applied to the bearing 30 to the walls of its respective cups 51, 61. Since each bearing ball contacts its respective stator and rotor cups 51, 61 at two points (i.e. one point on the annular side wall and one point on the circular wall of its respective cup) the total load applied to the bearing 30 is distributed over twelve points within the stator and rotor cups 51, 61 of the bearing 30. When the middle bearing ball 70 contacts the lower and upper bearing balls 58a, 58b and 58c and 64a, 64b and 64c at the preferred 45° angle, the load is distributed equally among the twelve points of contact. One other advantage associated with the design of the ball thrust bearing 30 is that it is to some degree self-adjusting if the applied thrust is a few degrees off center from its axis of rotation since the middle bearing ball 70 will continue to distribute the thrust load uniformly or very near uniformly despite minor misalignment. By contrast, a normal thrust bearing requires all balls in a circular cage to be equally loaded for best operation and life; otherwise one of the bearing balls is pinched in one area and unloaded on the other side. Hence conventional thrust bearings under high loads are much less able to accommodate off-center load misalignments.

The bearing balls 58a, 58b and 58c and 64a, 64b and 64c and 70 are all preferably formed from high tensile strength steel, such as ASTM A514. Such a material has a Young's Modulus of over 29,000,000 psi and a yield strength on the order of 690 Mpa or over 100,000 psi. Such material properties allows the thrust bearing 30 to bear very high compressive loads as each of the bearing balls 58a, 58b and 58c and 64a, 64b and 64c and 70 elastically deforms at its points of contact with adjacent bearing balls and the walls of the stator cup 51 and rotor cup 61 during operation, and constantly springs back into its original shape as these points of contact move around its spherical outer surface. Stainless steel may also be advantageously used and has the added benefit of corrosion resistance.

The combination of the vertical orientation of the shaft assembly 20 and the cageless ball thrust bearing 30 results in several mechanical synergies. First, such a combination requires only a single, high-load bearing 30 in order to operate. By contrast, energy-storing flywheels having horizontal axes require two high-load bearings, thereby increasing the expense of the flywheel assembly. Second, the wear on the single high-load bearing 30 is highly uniform, whereas the wear on the pair of high-load bearings used in horizontal shaft flywheel assemblies is concentrated around the lower half of the bearings. Finally, the high load applied to the thrust bearing 30 by the flywheel 35 advantageously serves to separate the lower and upper bearing balls 58a, 58b and 58c and 64a, 64b and 64c 120° apart around the stator and rotor, thereby obviating the need for cages for separating the bearing balls.

FIGS. 6A-6I illustrate other advantages associated with the ball thrust bearing 30 of the invention. These figures are based on empirical tests conducted by the applicant, and illustrate both the orbital and rotational movement of the bearing balls within the recess 52 of the stator 50 of the bearing 30 throughout eighteen rotations of the shaft assembly 20. Throughout these eighteen rotations, the three bearing balls 58a, 58b and 58c orbit the annular wall of the recess 52 twice, which is expected. What is not expected is the finding the bearing balls 58a, 58b and 58c do not rotate in any discernible pattern while orbiting the recess 52. More specifically, the bearing balls 58a, 58b and 58c do not rotate around a single axis as they orbit. While FIGS. 6A-6I illustrate only two orbits the three bearing balls 58a, 58b and 58c, the applicant has confirmed the lack of any discernible pattern in ball rotation over many more orbits than the ones illustrated. This same last of discernible rotational pattern may be reasonably inferred to apply to the upper set of bearing balls 64a, 64b and 64c. There are two substantial advantages associated with the non-patterned bearing ball rotation. First, the results of the applicant's tests indicate that wear over the surfaces of the bearing balls 58a, 58b and 58c and 64a, 64b and 64c will be uniform instead of concentrated at specific points on the bearing balls. Secondly, these test results indicate that lubricant from the outlet 54 will be spread evenly over the surfaces of all the bearing balls 58a, 58b and 58c and 64a, 64b and 64c and the middle ball 70.

As an example of the amount of kinetic energy that the flywheel and bearing assembly 1 is capable of storing, let us assume that the flywheel 35 of the assembly 1 illustrated in FIGS. 1A-3 consisted of three flywheel sections 37a-37c that were 7 feet in diameter and one foot in thickness (even though a more preferred thickness is four inches). Let us assume further that the flywheel sections are made from an 80%-20% mixture of pelletized steel and HDPE. Since the volume of a cylinder is $V=\pi R^2 h$, the volume of such a flywheel would be (3.1416) (12.25 ft.$^2$) (3 ft.)=115.45 ft.$^3$ Since the density of the flywheel would be 403 lbs./ft.$^3$, the total mass of the flywheel 35 would be 46,528 lbs. To avoid breaking the sound barrier, let us further assume that the flywheel was initially rotated at a speed of 3000 rpms (or 50 rotations per second). At such a rotational speed, the outer edge of the rims 39 of the flywheel sections 37a-37c would be moving at a linear speed of 1100 ft. per second, which is just under the sea level supersonic limit of 1126 ft. per second. The energy of a rotating disc may be computed according the following formula:

$$E_k = \tfrac{1}{4}\omega^2 MR^2$$

In the above formula, E equals energy, ω=radians per second, M=mass of the flywheel, and R=the radius of the flywheel. Accordingly, if ω=314 radians per second, M=46,528 lbs., and R$^2$=12.25 ft.$^2$, the total energy in foot pounds is (0.25)× (98,596)×(46,528)×(12.25)=14,049,141,230 ft.lbs. Since 1 kilowatt hour (kWh)=2,655,223.74 foot pounds (ft lb), the flywheel and bearing assembly 1 of this example would be storing 5,291 kilowatt hours of energy. According to some authorities, the average power consumption of a residential power customer in the US is 940 kilowatt hours (kWh) per month. Accordingly the energy stored in the aforementioned example of a flywheel and bearing assembly 1 of the invention could supply such a residential power customer with electricity for about five and a half months (assuming no frictional losses).

The invention has been described in detail with particular reference to certain preferred embodiments thereof, but it will be understood that variations and modifications can be effected within the spirit and scope of the invention. For example, a below-ground embodiment of the flywheel and bearing assembly can be made which largely obviates the need for a support frame 3. In such an alternative embodiment of the invention, the top member 10 and bearing plate 13 would be detachably mounted via bolts or the like in bridge-like fashion over the center of the recess containing the assembly 1. The flywheel 28 would be mounted on the top end of the spindle 22 above the bearing plate 13 to afford easy access to a drive belt.

The invention claimed is:
1. An energy-storing flywheel assembly, comprising:
a flywheel having a vertically-oriented axis of rotation, the flywheel being continuously solid at every point along its radius;
a shaft assembly connected to the flywheel and having an axis of rotation that is collinear with the axis of rotation of the flywheel,
a cageless ball thrust bearing rotatably supporting a lower end of the shaft, including
a stator having a cylindrical recess, and a set of three free-floating bearing balls contained within the stator recess;
a rotor rotatably mounted over the stator, the rotor having a cylindrical recess that is coaxial with the stator cylindrical recess and which likewise contains a set of three free-floating bearing balls, and
a single, middle bearing ball centrally disposed between and in mutual engagement with the three bearing balls of the stator and the three bearing balls of the rotor, wherein the diameter of the free-floating bearing balls is sufficiently smaller than the diameter of the cylindrical stator and rotor recesses that contain them such that the three bearing balls contained in both the stator and rotor cylindrical recesses do not contact one another when uniformly spaced 120° around their respective recesses, and
a supply of lubricant in communication with one of the stator and rotor.
2. The energy-storing flywheel assembly defined in claim 1, wherein the three bearing balls contained in the stator and the three bearing balls contained in the rotor have a same diameter.
3. The energy-storing flywheel assembly defined in claim 2, wherein the diameter of the middle bearing ball is no less than the ⅔rds the diameter and no greater than twice the diameter as that of the three bearing balls contained in the stator and the three bearing balls contained in the rotor.
4. The energy-storing flywheel assembly defined in claim 2, wherein the single, middle bearing ball contacts the three bearing balls of the stator and the three bearing balls of the rotor at about a 45° angle from a plane that intersects a center of the middle bearing ball.
5. The energy-storing flywheel assembly defined in claim 1, wherein.
6. The energy-storing flywheel assembly defined in claim 1, wherein the amount of mass per unit of circumferential length remains constant or increases in a radially outward direction.
7. The energy-storing flywheel assembly defined in claim 1, wherein the flywheel is formed from a plurality of stacked flywheel sections.
8. The energy-storing flywheel assembly defined in claim 7, wherein each flywheel section is substantially disc-shaped and includes a continuous metal rim that circumscribes its outer periphery.
9. The energy-storing flywheel assembly defined in claim 7, further comprising washers disposed between adjacent stacked flywheel sections.
10. The energy-storing flywheel assembly defined in claim 9, wherein each flywheel section is substantially formed from pelletized metal imbedded in a matrix of plastic material.
11. The energy-storing flywheel assembly defined in claim 10, wherein the pelletized metal is steel and the plastic material is HDPE.
12. The energy-storing flywheel assembly defined in claim 1, wherein each set of three free floating bearing balls rotates within its respective bearing cup at one-seventh to one-ninth a rotational speed of the shaft.
13. The energy-storing flywheel assembly defined in claim 1, wherein each set of three free floating bearing balls is formed of metal.
14. The energy-storing flywheel assembly defined in claim 1, wherein the metal forming each set of three free floating bearing balls is an iron alloy.
15. A cageless ball thrust bearing, comprising:
a stator having a cylindrical recess, and a set of three free-floating bearing balls contained within the stator recess;
a rotor rotatably mounted over the stator, the rotor having a cylindrical recess that is coaxial with the stator cylindrical recess and which likewise contains a set of three free-floating bearing balls, and
a single, middle bearing ball centrally disposed between and in mutual engagement with the three bearing balls of the stator and the three bearing balls of the rotor,
wherein the diameter of the free-floating bearing balls is sufficiently smaller than the diameter of the cylindrical stator and rotor recesses that contain them such that the three bearing balls contained in both the stator and rotor cylindrical recesses do not contact one another when uniformly spaced 120° around their respective recesses, and
a lubricant source in communication with the cageless ball thrust bearing that supplies a lubricant to the surfaces of the bearing balls.
16. The cageless ball thrust bearing defined in claim 15, wherein the three bearing balls contained in the stator and the three bearing balls contained in the rotor have a same diameter.
17. The cageless ball thrust bearing defined in claim 16, wherein the diameter of the middle bearing ball is no less than ⅔rds the diameter and no greater than twice the diameter as that of the three bearing balls contained in the stator and the three bearing balls contained in the rotor.
18. The cageless ball thrust bearing defined in claim 16, wherein the middle bearing ball has a same diameter as that of the three bearing balls contained in the stator and the three bearing balls contained in the rotor.
19. The cageless ball thrust bearing defined in claim 16, wherein the diameter of the bearing balls is sufficiently smaller than the diameter of the cylindrical stator and rotor recesses that contain them such that each ball bearing contacts both a cylindrical side wall and a flat, circular wall of the recess that contains it.
20. The cageless ball thrust bearing defined in claim 15, wherein the rotor includes a retention collar for retaining the bearing balls contained within its cylindrical recess when positioned over the stator.
21. The cageless ball thrust bearing defined in claim 15, wherein each set of three free floating bearing balls rotates within its respective bearing cup at one-seventh to one-ninth a rotational speed of the shaft.
22. The cageless ball thrust bearing defined in claim 15, wherein each set of three free floating bearing balls is formed of metal.

23. The cageless ball thrust bearing defined in claim 15, wherein the metal forming each set of three free floating bearing balls is an iron alloy.

\* \* \* \* \*